(12) United States Patent
Kane et al.

(10) Patent No.: US 8,305,485 B2
(45) Date of Patent: Nov. 6, 2012

(54) DIGITAL CAMERA WITH CODED APERTURE RANGEFINDER

(75) Inventors: Paul J. Kane, Rochester, NY (US);
Rodney L. Miller, Fairport, NY (US);
Sen Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 266 days.

(21) Appl. No.: 12/770,894

(22) Filed: Apr. 30, 2010

(65) Prior Publication Data

US 2011/0267508 A1  Nov. 3, 2011

(51) Int. Cl.
*G03B 13/00* (2006.01)
*H04N 5/232* (2006.01)
*G01C 3/08* (2006.01)
*G03B 13/20* (2006.01)

(52) U.S. Cl. ........ 348/348; 348/345; 348/362; 348/176; 356/4.01; 356/4.04; 396/139

(58) Field of Classification Search .......... 348/362–368, 348/345–357, 176; 396/138–143; 356/4.01–5.15
See application file for complete search history.

(56) References Cited

U.S. PATENT DOCUMENTS

| | | | | |
|---|---|---|---|---|
| 3,708,619 | A * | 1/1973 | Martin | 348/349 |
| 7,834,929 | B2 * | 11/2010 | Okawara | 348/347 |
| 2008/0030592 | A1 | 2/2008 | Border et al. | |
| 2008/0218611 | A1 | 9/2008 | Parulski et al. | |
| 2008/0218612 | A1 | 9/2008 | Border et al. | |
| 2008/0219654 | A1 | 9/2008 | Border et al. | |
| 2009/0028451 | A1 | 1/2009 | Slinger et al. | |
| 2010/0073518 | A1 * | 3/2010 | Yeh | 348/231.99 |
| 2010/0215219 | A1 * | 8/2010 | Chang et al. | 382/106 |

OTHER PUBLICATIONS

A.N. Rajagopalan et al.: "An MRF Model-Based Approach to Simultaneous Recovery of Depth and Restoration From Defocused Images", IEEE Transactions on Pattern Analysis and Machine Intelligence, IEEE Service Center, Los Alamitos, CA, US, vol. 21, No. 7, Jul. 1, 1999, pp. 577-589, XP000832594, ISSN: 0162-8828, DOI: DOI: 10.1109/34.777369, the whole document.

V.M. Bove, Pictorial Applications for Range Sensing Cameras, SPIE vol. 901, pp. 10-17, 1988.

(Continued)

*Primary Examiner* — Sinh Tran
*Assistant Examiner* — Christopher K Peterson
(74) *Attorney, Agent, or Firm* — Raymond L. Owens

(57) ABSTRACT

Method of using an image capture device to identify range information for objects in a scene includes providing an image capture device at least one image sensor, a coded aperture, a first optical path including the coded aperture and a second optical path not including the coded aperture; storing in a memory a set of blur parameters derived from range calibration data for the coded aperture; capturing a first and second image of the scene, corresponding to the first and second optical paths, the second image having equal or higher resolution than the first; providing a set of deblurred images using the first capture image and each of the blur parameters from the stored set; using the set of deblurred images to determine the range information for the objects captured by the first optical path; and using the range information to control the image capture or processing of second image.

18 Claims, 12 Drawing Sheets

OTHER PUBLICATIONS

J.W. Goodman, Introduction to Fourier Optics, MCGraw-Hill, San Francisco, 1968, pp. 113-117.

Veeraraghaven et al, Dappled Photography: Mask Enhanced Cameras for heterodyned Light Fields and Coded Aperture refocusing, ACM Transactions on graphics 26 (3), Jul. 2007, paper 69.

Levin et al, Image and Depth from a Conventional camera with a Coded Aperture, ACM Transactions on Graphics 26 (3), Jul. 2007, paper 70.

Dr. Arthur Cox, A Survey of Zoom Lenses, SPIE vol. 3129,0277-786x/97, Mar. 30, 2010.

* cited by examiner

FIG. 10

DIGITAL CAMERA WITH CODED APERTURE RANGEFINDER

CROSS REFERENCE TO RELATED APPLICATIONS

Reference is made to commonly assigned, co-pending U.S. patent application Ser. No. 12/612,135, filed Nov. 4, 2009, entitled "Image deblurring using a combined differential image", by Sen Weng, et al, co-pending U.S. patent application Ser. No. 12/770,810, filed concurrently herewith and entitled "Range measurement using coded aperture", by Paul J. Kane, et al, co-pending U.S. patent application Ser. No. 12/770,822 filed concurrently herewith and entitled "Range measurement using multiple coded apertures", by Paul J. Kane, et al, co-pending U.S. patent application Ser. No. 12/770,830 filed concurrently herewith and entitled Range measurement using a zoom camera, by Paul J. Kane, et al, and co-pending U.S. patent application Ser. No. 12/770,919, filed concurrently herewith and entitled "Range measurement using symmetric coded apertures", by Paul J. Kane, et al, all of which are incorporated herein by reference.

FIELD OF THE INVENTION

The present invention relates to an image capture device that is capable of determining range information for objects in a scene, and in particular a capture device that uses coded apertures and computational algorithms to efficiently determine the range information.

BACKGROUND OF THE INVENTION

Optical imaging systems are designed to create a focused image of scene objects over a specified range of distances. The image is in sharpest focus in a two dimensional (2D) plane in the image space, called the focal or image plane. From geometrical optics, a perfect focal relationship between a scene object and the image plane exists only for combinations of object and image distances that obey the thin lens equation:

$$\frac{1}{f} = \frac{1}{s} + \frac{1}{s'} \tag{1}$$

where f is the focal length of the lens, s is the distance from the object to the lens, and s' is the distance from the lens to the image plane. This equation holds for a single thin lens, but it is well known that thick lenses, compound lenses and more complex optical systems are modeled as a single thin lens with an effective focal length f. Alternatively, complex systems are modeled using the construct of principal planes, with the object and image distances s, s' measured from these planes, and using the effective focal length in the above equation, hereafter referred to as the lens equation.

It is also known that once a system is focused on an object at distance $s_1$, in general only objects at this distance are in sharp focus at the corresponding image plane located at distance $s_1'$. An object at a different distance $s_2$ produces its sharpest image at the corresponding image distance $s_2'$, determined by the lens equation. If the system is focused at $s_1$, an object at $s_2$ produces a defocused, blurred image at the image plane located at $s_1'$. The degree of blur depends on the difference between the two object distances, $s_1$ and $s_2$, the focal length f of the lens, and the aperture of the lens as measured by the f-number, denoted f/#. For example, FIG. 1 shows a single lens 10 with clear aperture of diameter D. The on-axis point $P_1$ of an object located at distance $s_1$ is imaged at point $P_1'$ at distance $s_1'$ from the lens. The on-axis point $P_2$ of an object located at distance $s_2$ is imaged at point $P_2'$ at distance $s_2'$ from the lens. Tracing rays from these object points, axial rays 20 and 22 converge on image point $P_1'$, whereas axial rays 24 and 26 converge on image point $P_2'$, then intercept the image plane of $P_1'$ where they are separated by a distance d. In an optical system with circular symmetry, the distribution of rays emanating from $P_2$ over all directions results in a circle of diameter d at the image plane of $P_1'$, which is called the blur circle or circle of confusion.

As on-axis point $P_1$ moves farther from the lens, tending towards infinity, it is clear from the lens equation that $s_1'=f$. This leads to the usual definition of the f-number as $f/\#=f/D$. At finite distances, the working f-number is defined as $(f/\#)_w=f/s_1'$. In either case, it is clear that the f-number is an angular measure of the cone of light reaching the image plane, which, in turn are related to the diameter of the blur circle d. In fact, it is shown that $$d = \frac{f}{(f/\#)s_2'}|s_2' - s_1'|. \tag{2}$$

By accurate measure of the focal length and f-number of a lens, and the diameter d of the blur circle for various objects in a two dimensional image plane, in principle it is possible to obtain depth information for objects in the scene by inverting the Eq. (2), and applying the lens equation to relate the object and image distances. This requires careful calibration of the optical system at one or more known object distances, at which point the remaining task is the accurate determination of the blur circle diameter d.

The above discussion establishes the basic principles behind passive optical ranging methods based on focus. That is, methods based on existing illumination (passive) that analyze the degree of focus of scene objects and relate this to their distance from the camera. Such methods are divided into two wide categories: depth from defocus methods assume that the camera is focused once and that a single image is captured and analyzed for depth, whereas depth from focus methods assume that multiple images are captured at different focus positions and the parameters of the different camera settings are used to infer the depth of scene objects.

The method presented above provides insight into the problem of depth recovery, but unfortunately is oversimplified and not robust in practice. Based on geometrical optics, it predicts that the out-of-focus image of each object point is a uniform circular disk or blur circle. In practice, diffraction effects and lens aberrations lead to a more complicated light distribution, characterized by a point spread function (psf), specifying the intensity of the light at any point (x,y) in the image plane due to, a point light source in the object plane. As explained by Bove (V. M. Bove, *Pictorial Applications for Range Sensing Cameras*, SPIE vol. 901, pp. 10-17, 1988), the defocusing process is more accurately modeled as a convolution of the image intensities with a depth-dependent psf:

$$i_{def}(x,y;z)=i(x,y)*h(x,y;z), \tag{3}$$

where $i_{def}(x,y;z)$ is the defocused image, i(x,y) is the in-focus image, h(x,y;z) is the depth-dependent psf and * denotes convolution. In the Fourier domain, this is written:

$$I_{def}(v_x,v_y)=I(v_x,v_y)H(v_x,v_y;z), \tag{4}$$

where $I_{def}(v_x, v_y)$ is the Fourier transform of the defocused image, $I(v_x, v_y)$ is the Fourier transform of the in-focus image, and $H(v_x, v_y;z)$ is the Fourier transform of the depth-dependent psf. Note that the Fourier Transform of the psf is the Optical Transfer Function, or OTF. Bove describes a depth-from-focus method, in which it is assumed that the psf is circularly symmetric, i. e. $h(x,y;z)=h(r;z)$ and $H(v_x,v_y;z)=H(\rho;z)$, where r and $\rho$ are radii in the spatial and spatial frequency domains, respectively. Two images are captured, one with a small camera aperture (long depth of focus) and one with a large camera aperture (small depth of focus). The Discrete Fourier Transform (DFT) is taken of corresponding windowed blocks in the two images; followed by a radial average of the resulting power spectra, meaning that an average value of the spectrum is computed at a series of radial distances from the origin in frequency space, over the 360 degree angle. At that point, the radially averaged power spectra of the long and short depth of field (DOF) images are used to compute an estimate for $H(\rho;z)$ at corresponding windowed blocks, assuming that each block represents a scene element at a different distance z from the camera. The system is calibrated using a scene containing objects at known distances $[z_1, z_2, \ldots z_n]$ to characterize $H(\rho;z)$, which then is related to the blur circle diameter. A regression of the blur circle diameter vs. distance z then leads to a depth or range map for the image, with a resolution corresponding to the size of the blocks chosen for the DFT.

Methods based on blur circle regression have been shown to produce reliable depth estimates. Depth resolution is limited by the fact that the blur circle diameter changes rapidly near focus, but very slowly away from focus, and the behavior is asymmetric with respect to the focal position. Also, despite the fact that the method is based on analysis of the point spread function, it relies on a single metric (blur circle diameter) derived from the psf.

Other depth from defocus methods seek to engineer the behavior of the psf as a function of defocus in a predictable way. By producing a controlled depth-dependent blurring function, this information is used to deblur the image and infer the depth of scene objects based on the results of the deblurring operations. There are two main parts to this problem: the control of the psf behavior, and deblurring of the image, given the psf as a function of defocus.

The psf behavior is controlled by placing a mask into the optical system, typically at the of the aperture stop. For example, FIG. 2 shows a schematic of an optical system from the prior art with two lenses 30 and 34, and a binary transmittance mask 32 including an array of holes placed in between. In most cases, the mask is the element in the system that limits the bundle of light rays that propagate from an axial object point, and is therefore by definition the aperture stop. If the lenses are reasonably free from aberrations, the mask, combined with diffraction effects, will largely determine the psf and OTF (see J. W. Goodman, *Introduction to Fourier Optics*, McGraw-Hill, San Francisco, 1968, pp. 113-117). This observation is the working principle behind the encoded blur or coded aperture methods. In one example of the prior art, Veeraraghavan et al (*Dappled Photography: Mask Enhanced Cameras for Heterodyned Light Fields and Coded Aperture Refocusing*, ACM Transactions on Graphics 26 (3), July 2007, paper 69) demonstrate that a broadband frequency mask composed of square, uniformly transmitting cells can preserve high spatial frequencies during defocus blurring. By assuming that the defocus psf is a scaled version of the aperture mask, a valid assumption when diffraction effects are negligible, the authors show that depth information is obtained by deblurring. This requires solving the deconvolution problem, i. e. inverting Eq. (3) to obtain $h(x,y;z)$ for the relevant values of z. In principle, it is easier to invert the spatial frequency domain counterpart of this equation, namely Eq. (4) which is done at frequencies for which $H(v_x, v_y;z)$ is nonzero.

In practice, finding a unique solution for deconvolution is well known as a challenging problem. Veeraraghavan et al solve the problem by first assuming the scene is composed of discrete depth layers, and then forming an estimate of the number of layers in the scene. Then, the scale of the psf is estimated for each layer separately, using the model $$h(x,y;z)=m(k(z)x/w,k(z)y/w), \quad (5)$$

where $m(x,y)$ is the mask transmittance function, $k(z)$ is the number of pixels in the psf at depth z, and w is the number of cells in the 2D mask. The authors apply a model for the distribution of image gradients, along with Eq. (5) for the psf, to deconvolve the image once for each assumed depth layer in the scene. The results of the deconvolutions are desirable only for those psfs whose scale they match, thereby indicating the corresponding depth of the region. These results are limited in scope to systems behaving according to the mask scaling model of Eq. (5), and masks composed of uniform, square cells.

Levin et al (*Image and Depth from a Conventional Camera with a Coded Aperture*. ACM Transactions on Graphics 26 (3), July 2007, paper 70) follow a similar approach to Veeraraghavan, however, Levin et al rely on direct photography of a test pattern at a series of defocused image planes, to infer the psf as a function of defocus. Also, Levin et at investigated a number of different mask designs in an attempt to arrive at an optimum coded aperture. They assume a Gaussian distribution of sparse image gradients, along with a Gaussian noise model, in their deconvolution algorithm. Therefore, the optimized coded aperture solution is dependent on assumptions made in the deconvolution analysis.

The methods described so far rely on a single lens-sensor combination to obtain the depth of objects in the scene and to record an image of the scene. In cases where a pupil mask or coded aperture is used in the optical path, this requires that the effects of the coded aperture on the image be removed to produce an acceptable image. This requires complex digital image processing.

Other methods of depth determination include dual-lens stereographic image capture, followed by image disparity calculation, and range determination based on disparities and camera parameters. There are numerous examples of this in the prior art. These methods require storage of and computations with at least two full resolution digital images.

More recent methods include US2008/0030592A1 to Border et al, which describes simultaneous capture of a first low resolution image, and a second higher resolution image of the same scene. A composite image is formed by combining the two images and depth maps are produced if the two images overlap, have parallax, and are resampled to the same pixel count. Another example is US2008/0219654A1 to Border et al, which describes a dual lens camera with improved focusing capability that is capable of generating a range map. Once again, images from two lenses and two sensors are combined to compute the depth information. In US2008/0218612A1, Border et al describe a camera using multiple lenses and image sensors in a rangefinder configuration to produce a range map. In this device, both the primary and secondary units are used to obtain the depth information, relying on the parallax created by the separation between lenses to compute the depth. In US2008/0218611A1, Parulski et al describe the operation of a dual lens camera in which a secondary lens and sensor unit generates information used to enhance the primary image in a variety of ways. However, this secondary unit is not a depth measuring device.

SUMMARY OF THE INVENTION

The methods described above involve various design tradeoffs and accommodations to produce depth information. There is still a need for a camera device that can efficiently provide depth information about a scene as well as capture high quality images. Furthermore, there is a need for camera devices that can provide depth information that is useful in controlling the capture of the images, and the post processing of the captured images.

The present invention represents a method for using an image capture device to identify range information for objects in a scene, comprising:

a) providing an image capture device having at least one image sensor, a coded aperture, a first optical path including the coded aperture and a second optical path not including the coded aperture;

b) storing in a memory a set of blur parameters derived from range calibration data for the coded aperture;

c) capturing a first and second image of the scene having a plurality of objects, corresponding to the first and second optical paths, respectively, the first image having lower resolution than the second;

d) providing a set of deblurred images using the first capture image and each of the blur parameters from the stored set;

e) using the set of deblurred images to determine the range information for the objects in the scene captured by the first optical path; and f) using the range information to control the image capture device or processing of the higher resolution second image.

The invention has the advantage that it uses one optical system to perform image capture and another optical system to perform depth ranging, and the two systems need not be synchronized in terms of operation or its specifications. Further, the depth information obtained by the depth ranging unit is used to improve the quality of the images captured by the primary imaging unit, for object recognition, or other processing operations applied to the captured image.

BRIEF DESCRIPTION OF THE DRAWINGS

FIG. 10 is a schematic showing an array of indices centered on a current pixel location according to one embodiment of the present invention.

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein are selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
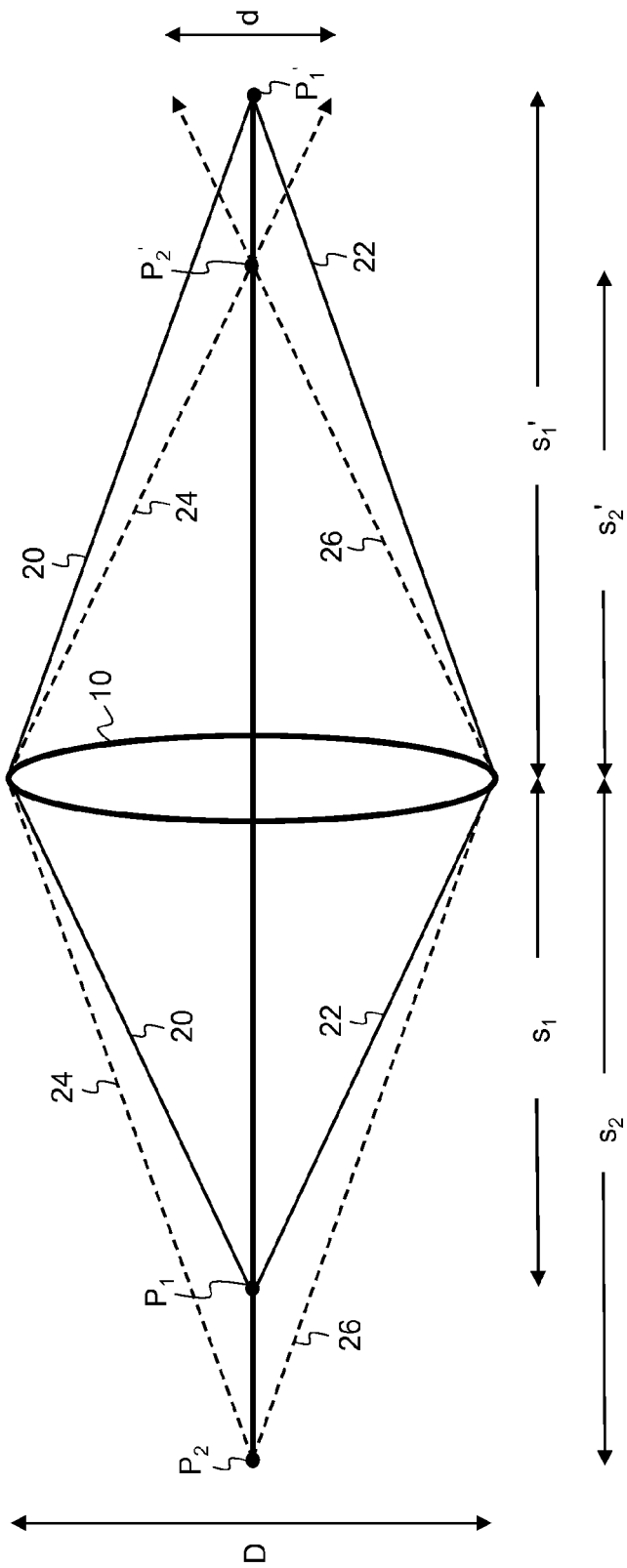
FIG. 1 is a schematic of a single lens optical system as known in the prior art.
Figure 2:
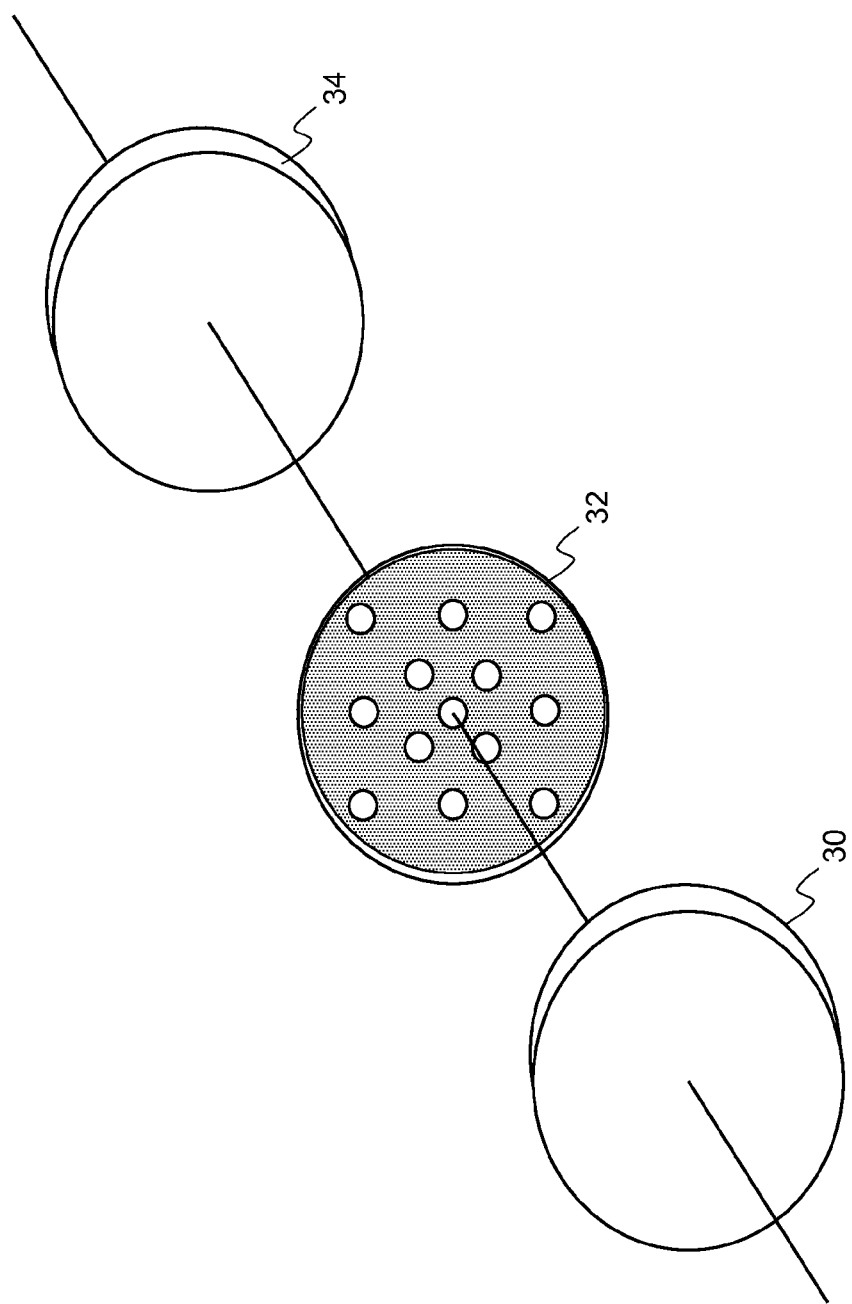
FIG. 2 is a schematic of an optical system with a coded aperture mask as known in the prior art.
Figure 3:
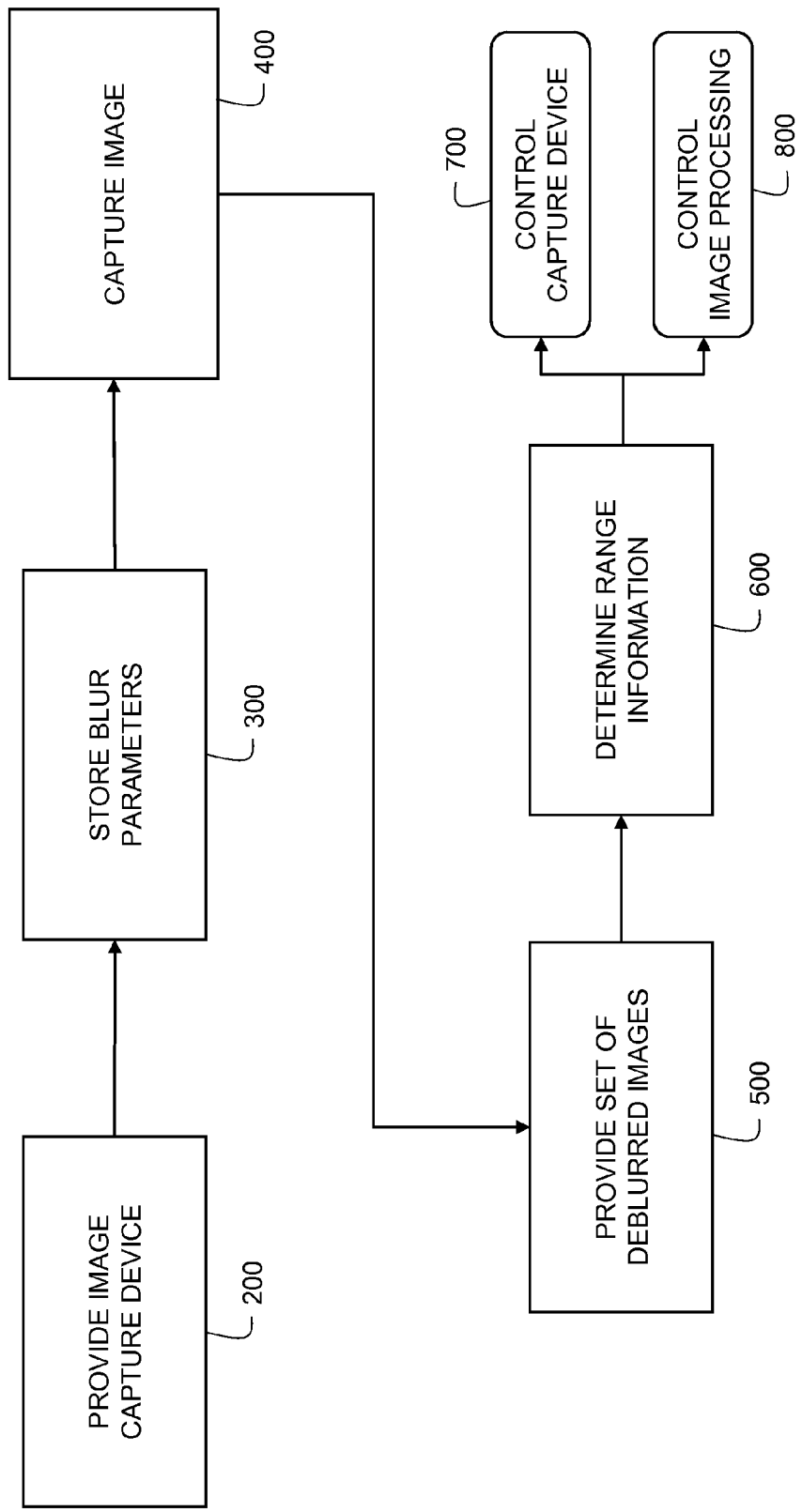
FIG. 3 is a flow chart showing the steps of a method of using an image capture device to identify range information for objects in a scene according to one embodiment of the present invention.
Figure 4:
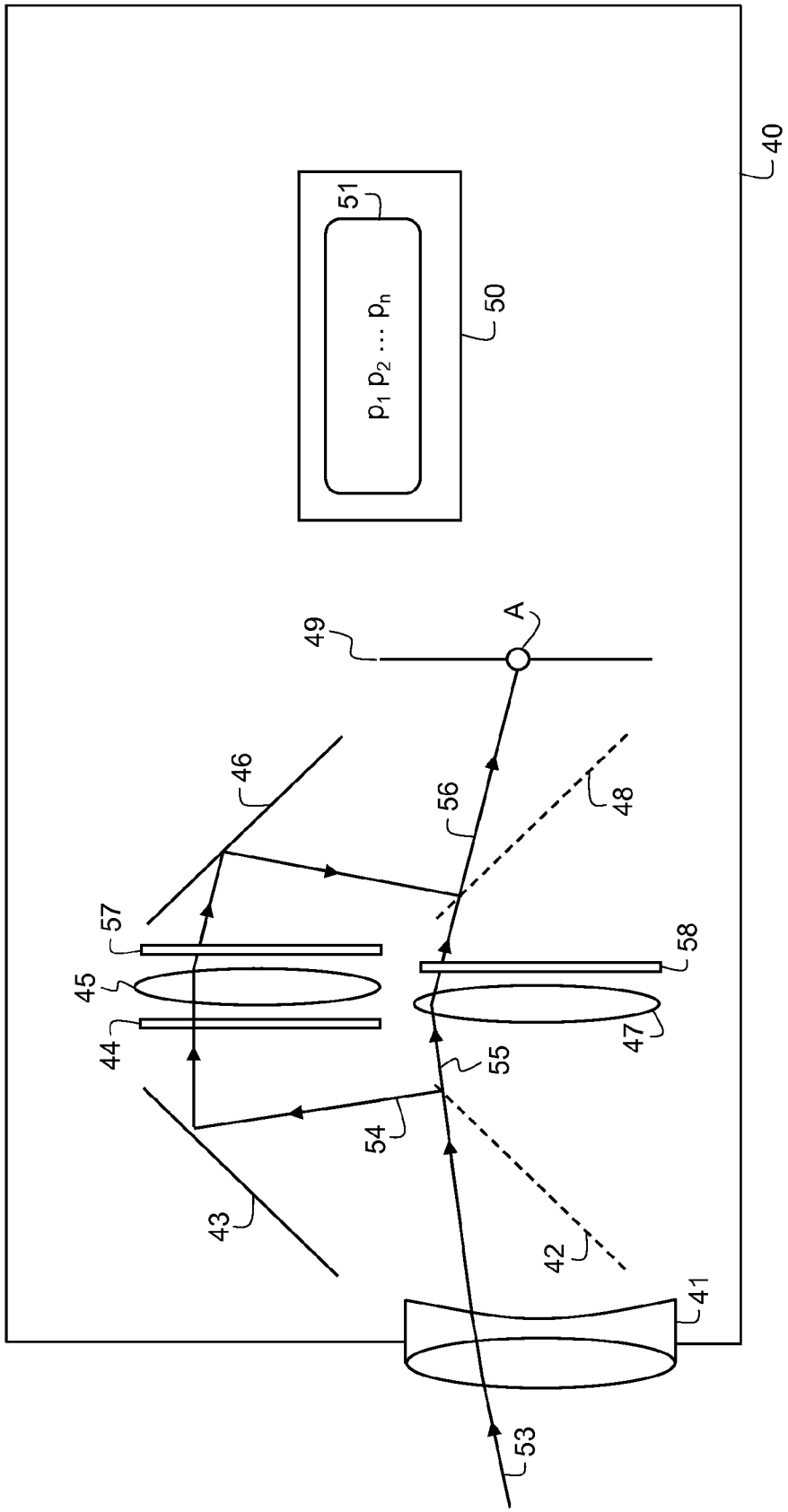
FIG. 4 is a schematic of a capture device according to one embodiment of the present invention.

FIG. 3 is a flow chart showing the steps of a method of using an image capture device to identify range information for objects in a scene according to an embodiment of the present invention. The method includes the steps of: providing an image capture device 200 having an image sensor, at least two coded apertures, and a lens; storing in a memory 300 a set of blur parameters derived from range calibration data for each coded aperture; capturing images of the scene 400 having a plurality of objects using each of the coded apertures, providing a set of deblurred images 500 using the capture image and each of the blur parameters from the stored set, using the set of blurred images to determine the range information 600 for objects in the scene, and further using the range information to control the image capture device 700 or control the processing 800 of the higher resolution second image An image capture device includes one or more image capture devices that implement the methods of the various embodiments of the present invention, including the example image capture devices described herein. The phrases "image capture device" or "capture device" are intended to include any device including a first optical path which forms a focused image of a scene through a coded aperture at an image plane, and a second optical path which forms a focused image of a scene, not including a coded aperture, at an image plane, wherein an electronic image sensor is located at the image plane for the purposes of recording and digitizing the image. These include a digital camera, cellular phone, digital video camera, surveillance camera, web camera, television camera, multimedia device, or any other device for recording images. FIG. 4 shows a side view schematic of one such capture device according to one embodiment of the present invention. The capture device 40 includes an objective lens 41, shown here as a compound lens, a beamsplitter 42, mirror 43, coded aperture 44, relay lens 45, mirror 46, relay lens 47, beam combiner 48 and electronic sensor array 49. The operation of the capture device 40 is understood more clearly by tracing an axial ray from a scene object (not shown) through the system. As shown in FIG. 4, axial ray 53 is directed by objective lens 41 towards beamsplitter 42, where it splits into a reflected light ray 54 and transmitted light ray 55. Reflected light ray 54 is directed towards mirror 43 and then through coded aperture 44 and relay lens 45. Relay lens 45 further directs light ray 54 towards mirror 46 and beam combiner 48. Simultaneously, transmitted light ray 55 is directed by relay lens 47 towards beam combiner 48. At beam combiner 48, light ray 55 is partially transmitted, and light ray 54 is partially reflected to form reflected light ray 56, which intercepts the sensor plane 49 at the axial image point A. Light rays 55 and 54 can also produce reflected and transmitted rays, respectively, at the beam combiner 48, which are of no utility and are omitted from the diagram. Also included in the capture device are shutters 57 and 58, which are used to alternately block the first or second optical paths, so that the electronic sensor is used to alternately capture the scene through the first coded aperture path (hereafter referred to as a range image) or capture the scene through the second path (hereafter referred to as a standard image). In this example, the first optical path, including the coded aperture, includes components 41, 42, 43, 44, 45, 57, 46, 48 and 49, whereas the second optical path, not including the coded aperture, includes the components 41, 42, 47, 58, 48 and 49. Preferably, the coded aperture 44 is located at the aperture stop of the optical system that includes the first optical path, or one of the images of the aperture stop, which are known in the art as the entrance and exit pupils. This can necessitate placement of the coded aperture 44 in between elements of a compound lens 42, as illustrated in FIG. 3, depending on the location of the aperture stop. The coded aperture 44 is of the light absorbing type, so as to alter only the amplitude distribution across the optical wavefronts incident upon it, or the phase type, so as to alter only the phase delay across the optical wavefronts incident upon it, or of mixed type, so as to alter both the amplitude and phase.

In some arrangements of the invention, as the shutters 57 and 58 are used to alternately capture a range image and a standard image, the resolution of the captured images is changed between captures. This is advantageous because the rate of change of scene depth across the image frame is slower than the rate of change of scene detail, permitting the range image to be captured at less resolution than the standard image. This implies that the storage and processing requirements for the range image is less than those for the standard image. Since in this arrangement, the first and second optical paths share the same image sensor, the change in resolution between the capture of the range and standard images is accomplished by either electronic sub-sampling of the range image during sensor readout, or numerical sub-sampling of the range image after sensor readout. In some arrangements, reducing the resolution of the range capture also permits relaxing the performance requirements on the optical components of the first optical path. Therefore, the shutters 57 and 58 permit the image sensor 49 to be alternately coupled with either the first or second optical path. In this way, the capture device 40 can first acquire a range image, and the device can use the range information from this image to control the capture or processing of the images from the second optical path.

Returning to FIG. 3, the step of storing in a memory 300 a set of blur parameters refers to storing a representation of the psf of the image capture device 40 for a series of object distances and defocus distances. Storing the blur parameters includes storing a digitized representation of the psf, specified by discrete code values in a two dimensional matrix. It also includes storing mathematical parameters derived from a regression or fitting function that has been applied to the psf data, such that the psf values for a given (x,y,z) location are readily computed from the parameters and the known regression or fitting function. Such memory can include computer disk, ROM, RAM or any other electronic memory known in the art. Such memory can reside inside the camera, or in a computer or other device electronically linked to the camera. In the embodiment shown in FIG. 4, the memory 50 storing blur parameters 51 i. e. $[p_1, p_2, \ldots p_n]$, for the coded aperture, is located inside the camera 40.

Figure 5:
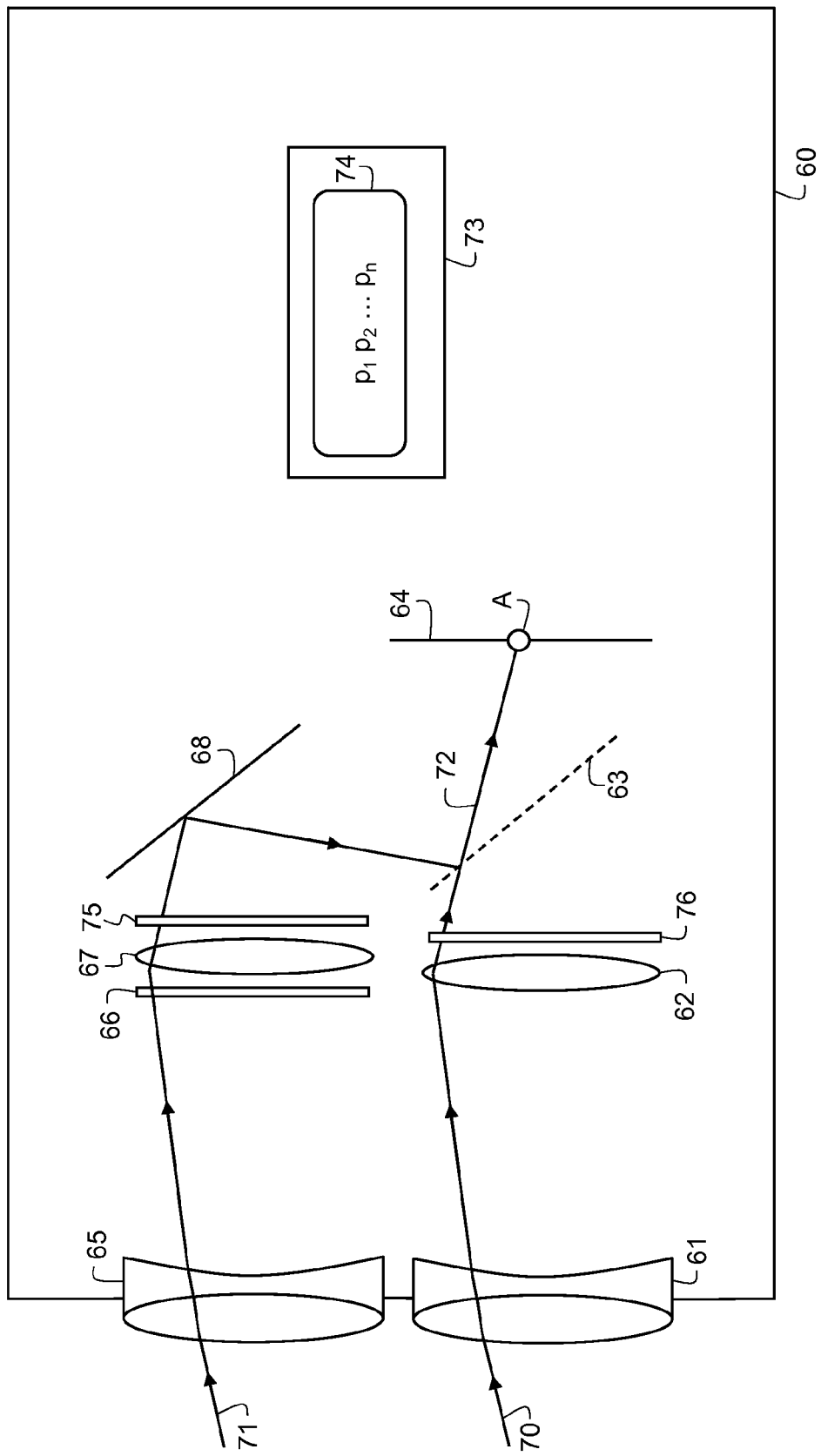
FIG. 5 is a schematic of a capture device according to another embodiment of the present invention.

FIG. 5 is a schematic of an alternate arrangement of a capture device in accord with the present invention. The capture device 60 includes two objective lenses 61 and 65, coded aperture 66, relay lenses 62 and 67, mirror 68, beam combiner 63 and electronic sensor array 64. As shown in FIG. 5, axial ray 70 from a scene object (not shown) is directed by objective lens 61 towards relay lens 62, where it is further directed towards beam combiner 63. Simultaneously, axial ray 71 from the same scene object is directed by objective lens 65 towards coded aperture 66 and relay lens 67, where it is further directed towards mirror 68 and beam combiner 63. At beam combiner 63, ray 70 is partially transmitted, and ray 70 is partially reflected to form transmitted light ray 72, which intercepts the electronic sensor array 64 at the axial image point A. Rays 71 and 70 can also produce reflected and transmitted rays, respectively, at the beam combiner 63, which are of no utility and are omitted from the diagram. Also included in the capture device are shutters 75 and 76, which are used to alternately block the first or second optical paths, so that the electronic sensor array 64 is used to alternately capture range and standard images. As in the previous example, the shutters 75 and 76 permit the electronic sensor array 64 to be alternately coupled with either the first or second optical path. In this way, the capture device 60 can first acquire a range image, and the device can use the range information from this image to control the capture or processing of the images from the second optical path. In some arrangements, the resolution of the captured images is changed between captures, in the same manner that was described for the arrangement of FIG. 4. The performance requirements on the optical components are relaxed for the first optical path if the range capture is always to be taken at lower resolution than the standard capture. In this example, the first optical path including the coded aperture 66, includes components 65, 66, 67, 75, 68, 63, and 64, whereas the second optical path, not including the coded aperture, includes the components 61, 62, 76, 63 and 64. Once again, the coded aperture 66 is preferably located at the aperture stop of the first optical path, or in alternate arrangements, its entrance and exit pupils. In the arrangement shown in FIG. 5, a memory 73 storing blur parameters 74 for the coded aperture 66 is located inside the camera 60.

Figure 6:
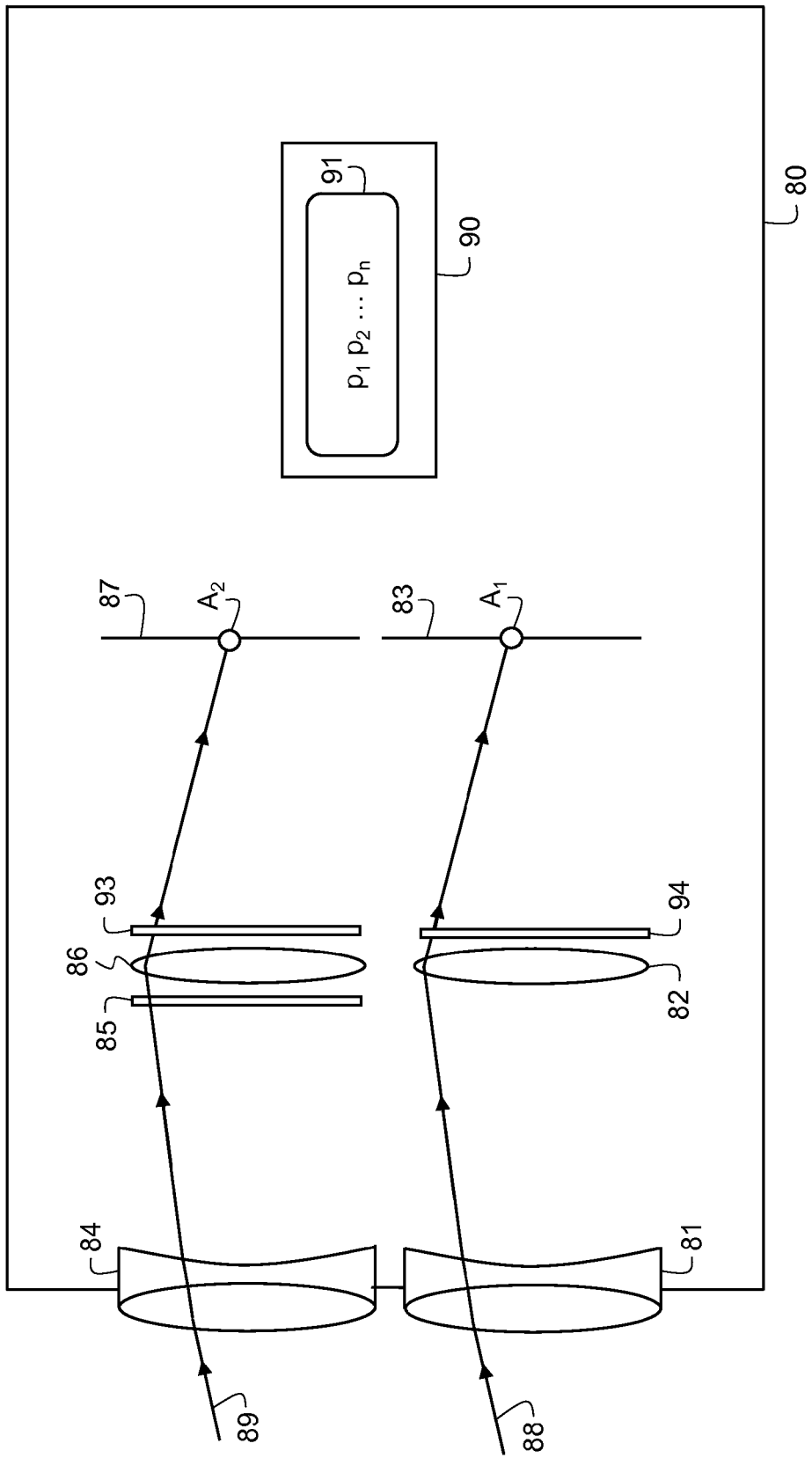
FIG. 6 is a schematic of a capture device according to another embodiment of the present invention.

FIG. 6 is a schematic of another alternate arrangement of a capture device in accord with the present invention. The capture device 80 includes two objective lenses 81 and 84, coded aperture 85, relay lenses 82 and 86 and electronic sensor arrays 83 and 87 As shown in FIG. 6, axial ray 88 from a scene object (not shown) is directed by objective lens 81 towards relay lens 82, where it is further directed to axial image point $A_1$ on electronic sensor array 83. Simultaneously, axial ray 89 from the same scene object is directed by objective lens 84 towards coded aperture 85 and relay lens 86, where it is further directed to axial image point $A_2$ on electronic sensor array 87. Also included in the capture device 80 are shutters 93 and 94, which are used to block either or both of the first or second optical paths. Although the two optical paths do not share a common sensor in this arrangement, there are various reasons for blocking one or both sensors at various times. For example, the light gathering capability of the two optical paths is different, causing one sensor to saturate when the other is properly exposed. In this case, it is preferred to close the shutter in the saturating path to prevent sensor damage. In this example, the first optical path including the coded aperture 85 includes components 84 through 87, and 93, whereas the second optical path, not including the coded aperture 85, includes the components 81 through 83, and 94. Once again, the coded aperture 85 is preferably located at the aperture stop of the first optical path, or in alternate arrangements, its entrance and exit pupils. In the arrangement shown in FIG. 6, a memory 90 storing blur parameters 91 for the coded aperture 85 is located inside the camera 80. In some arrangements of the dual-lens, dual-sensor design shown here, the resolution of the electronic sensor arrays 83 and 87 is different, and in particular, for reasons given above, the resolution of electronic sensor array 87 used to capture range images is lower than that of electronic sensor array 83 used to capture standard images. In addition to permitting lower storage and processing requirements for the range image, the performance requirements on many components in the first optical path are relaxed, including the objective lens 84 and relay lens 86. This implies that the range capture system (first optical path) is a less expensive system than the standard capture system (second optical path). Whether or not the shutters 93 and 94 are used, the capture device 80 can first acquire a range image through the first optical path using electronic sensor array 87, and the device can use the range information from this image to control the capture or processing of the images from the second optical path using electronic sensor array 83. The time interval between captures should permit processing of the range image acquired by the first optical path.

Figure 7:
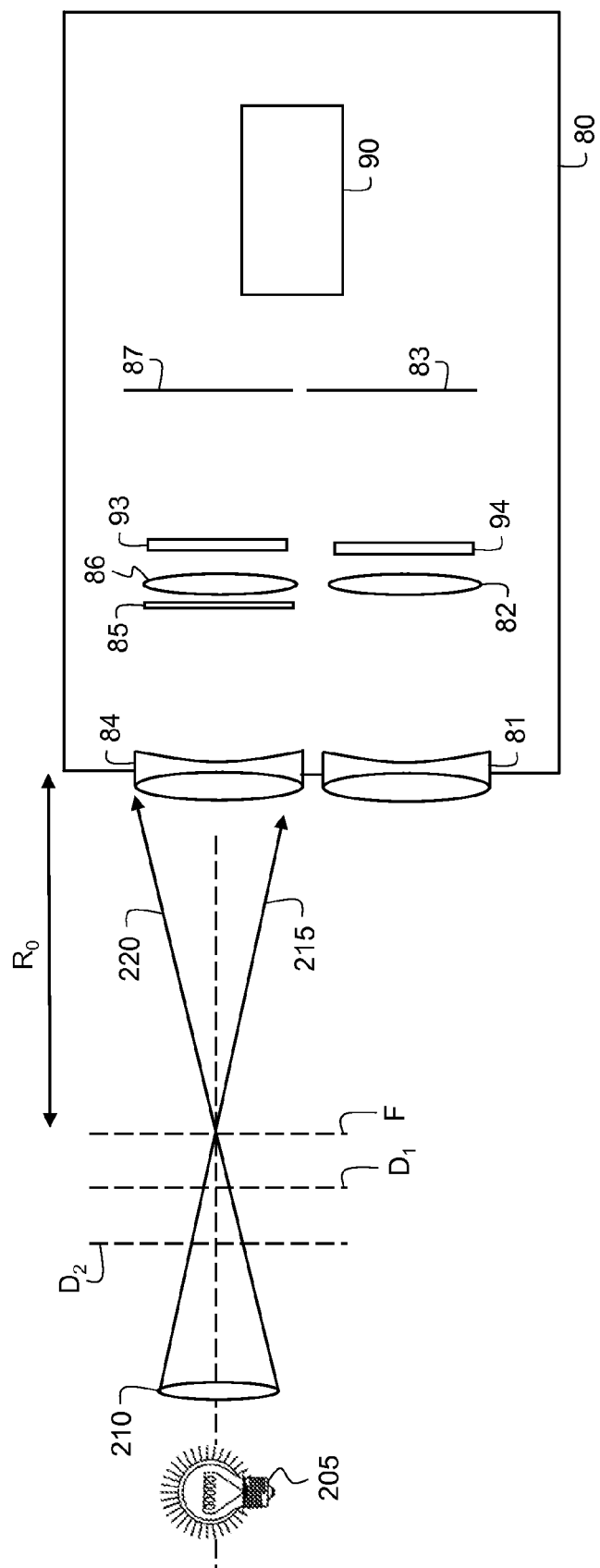
FIG. 7 is a schematic of a laboratory setup for obtaining blur parameters for one object distance and a series of defocus distances according to one embodiment of the present invention.

FIG. 7 is a schematic of a laboratory setup for obtaining blur parameters for one object distance and a series of defocus distances in accord with the present invention. The capture device arrangement of FIG. 6 is used in this example. In FIG. 7, a simulated point source including a light source 205 is focused by condenser optics 210 at a point on the optical axis intersected by the focal plane F, which is also the plane of focus of the capture device 80, located at object distance $R_O$. The light rays 215 and 220 passing through the point of focus appear to emanate from a point source located on the optical axis of the first optical path at distance $R_O$ from the capture device 80. With the coded aperture 85 in place, an image of this light is captured, thus recording the psf of the first optical path at object distance $R_O$. The defocused psf for objects at other distances from the capture device 80 are obtained by moving the light source 205 and condenser optics 210 (in this example, to the left) together so as to move the location of the effective point source to other planes, for example $D_1$ and $D_2$, while maintaining the capture device 80 focus position at plane F. The distances (or range data) from the capture device 80 to planes F, $D_1$ and $D_2$ are then recorded along with the psf images to complete the set of range calibration data. It will be appreciated by those skilled in the art that a similar procedure is carried out to calibrate the capture device arrangements shown in FIGS. 4 and 5, with some modifications specific to those arrangements. In the arrangement of FIG. 5, both optical paths share the same sensor. The capture device 60 is aligned with the simulated point source along the optical axis of the coded aperture subsystem, and the shutter 76 of the imaging subsystem is closed, since the light captured by this system does not pertain to calibration of the coded aperture 66, and therefore adds error to the calibration. In the arrangement of FIG. 4, there is only one optical axis for alignment, and the shutter 58 of the imaging subsystem is closed during coded aperture calibration.

Returning to FIG. 3, the step of capturing an image of the scene 400 includes capturing two images of the scene, with first and second optical paths, or two digital image sequences, also known in the art as motion or video sequences, one image sequence for each of the first and second paths. In this way the method includes the ability to identify range information for one or more moving objects in a scene. This is accomplished by determining range information 600 for each image in the sequence, or by determining range information for some subset of images in the sequence. In some embodiments, a subset of images in the sequence is used to determine range information for one or more moving objects in the scene, as long as the time interval between the images chosen is sufficiently small to resolve significant changes in the depth or z-direction. That is, this will be a function of the objects' speed in the z-direction and the original image capture interval or frame rate. In other embodiments, the determination of range information for one or more moving objects in the scene is used to identify stationary and moving objects in the scene. This is especially advantageous if the moving objects have a z-component to their motion vector, i. e. their depth changes with time, or image frame. Stationary objects are identified as those objects for which the computed range values are unchanged with time after accounting for motion of the camera, whereas moving objects have range values that can change with time. In yet another embodiment, the range information associated with moving objects is used by an image capture device to track such objects.

In some embodiments, the invention includes the using the range information acquired in the first or range image sequence to control the image capture or processing of some or all of the images in the second or standard image sequence. In other embodiments, the invention includes using the range information from some subset of images in the first or range image sequence, which is of lower resolution, to control the image capture or processing of some or all of the images in the second or standard image sequence.

Figure 8:
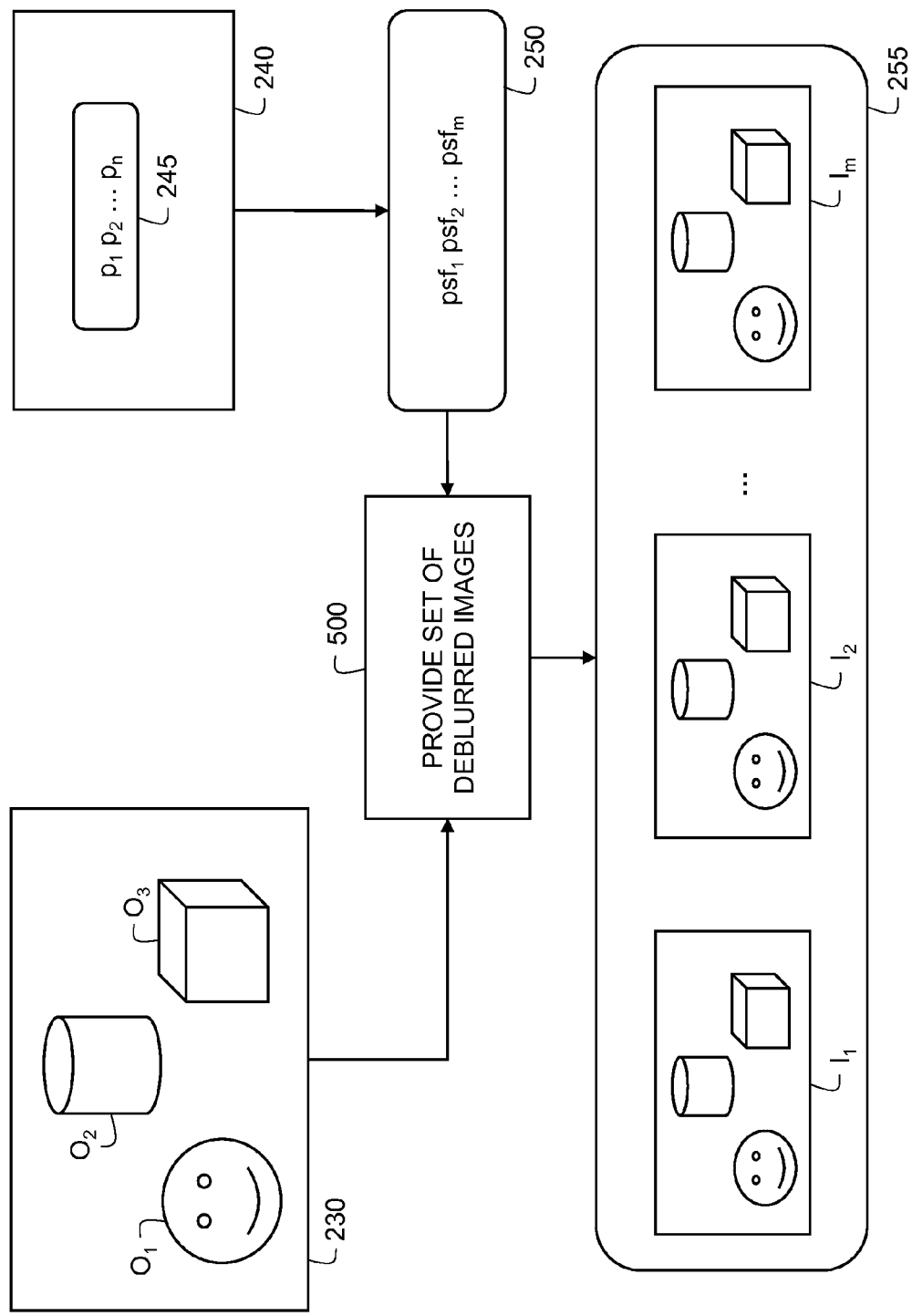
FIG. 8 is a process diagram illustrating how a captured image and blur parameters are used to provide a set of deblurred images, according to one embodiment of the present invention.

FIG. 8 shows a process diagram in which a captured image 230 and blur parameters 245, denoted by $[p_1, p_2, \ldots p_n]$, stored in a memory 240 are used to provide 500 a set of deblurred images 255. The blur parameters are a set of two dimensional matrices that approximate the psf of an image capture device for the distance at which the image was captured, and a series of defocus distances covering the range of objects in the scene. Alternatively, the blur parameters 245 are mathematical parameters from a regression or fitting function as described above. In either case, a digital representation of the point spread functions 250 that span the range of object distances of interest in the object space, represented in FIG. 8 as the set [$psf_1, psf_2, \ldots psf_m$], are computed from the blur parameters 245. Here the subscripts refer to the $m^{th}$ range value. In the preferred embodiment, there is a one-to-one correspondence between the blur parameters 245 and the set of digitally represented psfs 250. In some embodiments, there is not a one-to-one correspondence. In some embodiments, digitally represented psfs at defocus distances for which blur parameter data has not been recorded are computed by interpolating or extrapolating blur parameter data from defocus distances for which blur parameter data is available.

The digitally represented psfs 250 are used in a deconvolution operation to provide a set of deblurred images 255. Thus, the captured image 230 is deconvolved m times, once for each of the m elements in the set 250, to create a set of m deblurred images 255. The deblurred image set, whose elements are denoted [$I_1, I_2, \ldots I_m$], is then further processed with reference to the original captured image 230, to determine the range information 600 for the scene elements $O_1$, $O_2$ and $O_3$.

Figure 9:
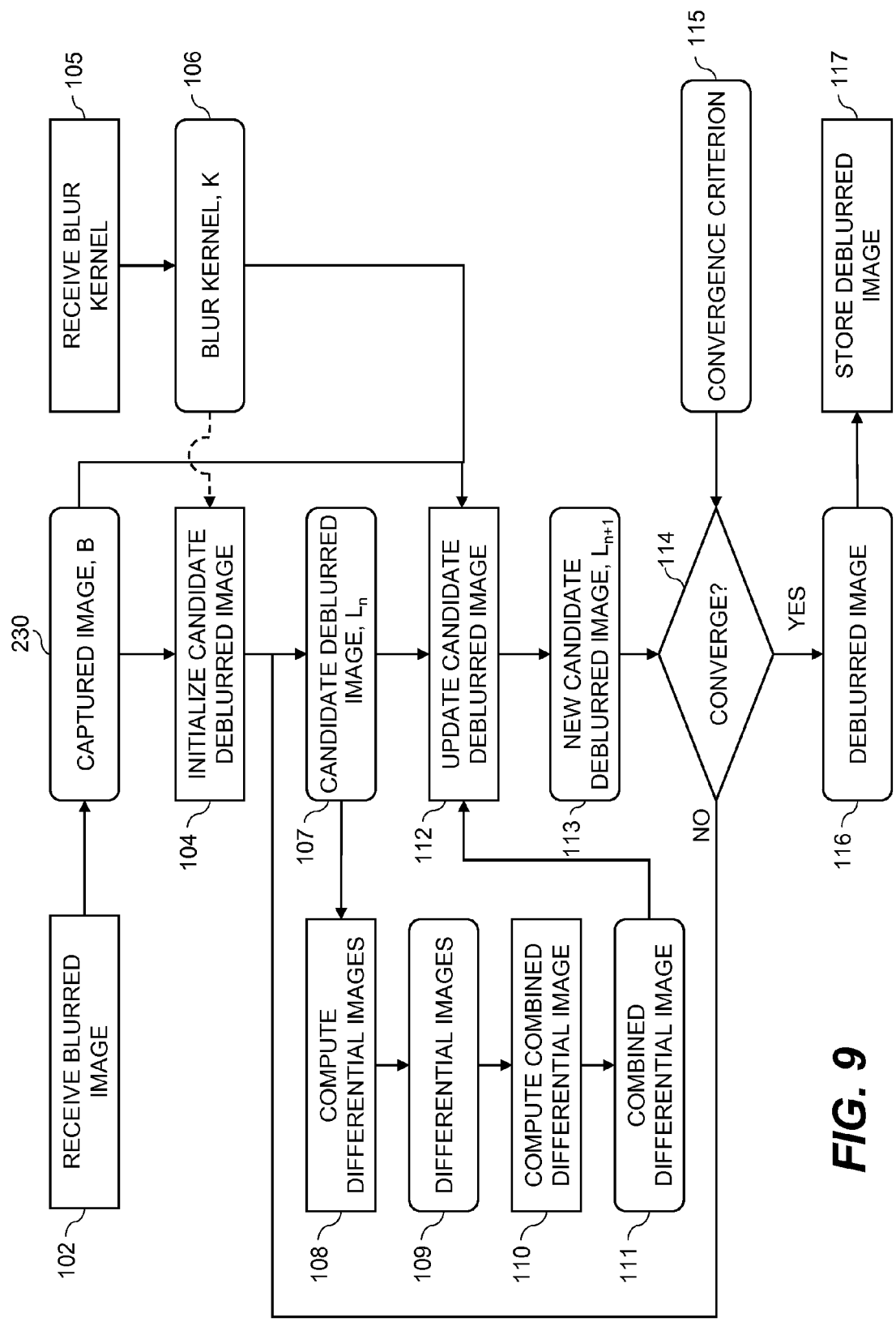
FIG. 9 is a process diagram illustrating the deblurring of a single image according to one embodiment of the present invention.

The step of providing a set of deblurred images 500 will now be described in further detail with reference to FIG. 9, which illustrates the process of deblurring a single image using a single element of the set of psfs 250 in accordance with the present invention. As is known in the art, the image to be deblurred is referred to as the blurred image, and the psf representing the blurring effects of the camera system is referred to as the blur kernel. A receive blurred image step 102 is used to receive the captured image 230 of the scene. Next a receive blur kernel step 105 is used to receive a blur kernel 106 which has been chosen from the set of psfs 250. The blur kernel 106 is a convolution kernel that is applied to a sharp image of the scene to produce an image having sharpness characteristics approximately equal to one or more objects within the captured image 230 of the scene.

Next an initialize candidate deblurred image step 104 is used to initialize a candidate deblurred image 107 using the captured image 230. In a preferred embodiment of the present invention, the candidate deblurred image 107 is initialized by simply setting it equal to the captured image 230. Optionally, any deconvolution algorithm known to those in the art is used to process the captured image 230 using the blur kernel 106, and the candidate deblurred image 107 is then initialized by setting it equal to the processed image. Examples of such deconvolution algorithms would include conventional frequency domain filtering algorithms such as the well-known Richardson-Lucy (RL) deconvolution method described in the background section. In other embodiments, where the captured image 230 is part of an image sequence, a difference image is computed between the current and previous image in the image sequence, and the candidate deblurred image is initialized with reference to this difference image. For example, if the difference between successive images in the sequence is currently small, the candidate deblurred image would not be reinitialized from its previous state, saving processing time. The reinitialization is saved until a significant difference in the sequence is detected. In other embodiments, only selected regions of the candidate deblurred image are reinitialized if significant changes in the sequence are detected in only selected regions. In yet another embodiment, the range information is recomputed for only selected regions or objects in the scene where a significant difference in the sequence is detected, thus saving processing time.

Next a compute differential images step 108 is used to determine a plurality of differential images 109. The differential images 109 can include differential images computed by calculating numerical derivatives in different directions (e. g., x and y) and with different distance intervals (e. g., $\Delta x=1, 2, 3$). A compute combined differential image step 110 is used to form a combined differential image 111 by combining the differential images 109.

Next an update candidate deblurred image step 112 is used to compute a new candidate deblurred image 113 responsive to the blurred image (i.e. the captured image 230) the blur kernel 106, the candidate deblurred image 107, and the combined differential image 111. As will be described in more detail later, in a preferred embodiment of the present invention, the update candidate deblurred image step 112 employs a Bayesian inference method using Maximum-A-Posterior (MAP) estimation.

Next, a convergence test 114 is used to determine whether the deblurring algorithm has converged by applying a convergence criterion 115. The convergence criterion 115 is specified in any appropriate way known to those skilled in the art. In a preferred embodiment of the present invention, the convergence criterion 115 specifies that the algorithm is terminated if the mean square difference between the new candidate deblurred image 113 and the candidate deblurred image 107 is less than a predetermined threshold. Alternate forms of convergence criteria are well known to those skilled in the art. As an example, the convergence criterion 115 is satisfied when the algorithm is repeated for a predetermined number of iterations. Alternatively, the convergence criterion 115 can specify that the algorithm is terminated if the mean square difference between the new candidate deblurred image 113 and the candidate deblurred image 107 is less than a predetermined threshold, but is terminated after the algorithm is repeated for a predetermined number of iterations even if the mean square difference condition is not satisfied.

If the convergence criterion 115 has not been satisfied, the candidate deblurred image 107 is updated to be equal to the new candidate deblurred image 113. If the convergence criterion 115 has been satisfied, a deblurred image 116 is set to be equal to the new candidate deblurred image 113. A store deblurred image step 117 is then used to store the resulting deblurred image 116 in a processor-accessible memory. The processor-accessible memory is any type of digital storage such as RAM or a hard disk.

In a preferred embodiment of the present invention, the deblurred image 116 is determined using a Bayesian inference method with Maximum-A-Posterior (MAP) estimation. Using the method, the deblurred image 116 is determined by defining an energy function of the form:

$$E(L) = (L \otimes K - B)^2 + \lambda D(L) \quad (6)$$

where L is the deblurred image 116, K is the blur kernel 106, B is the blurred (i.e. captured) image 230, $\otimes$ is the convolution operator, $D(L)$ is the combined differential image 111 and $\lambda$ is a weighting coefficient In a preferred embodiment of the present invention the combined differential image 111 is computed using the following equation:

$$D(L) = \sum_j w_j (\partial_j L)^2 \quad (7)$$

where j is an index value, $\partial_j$ is a differential operator corresponding to the $j^{th}$ index, $w_j$ is a pixel-dependent weighting factor which will be described in more detail later.

Figure 10:
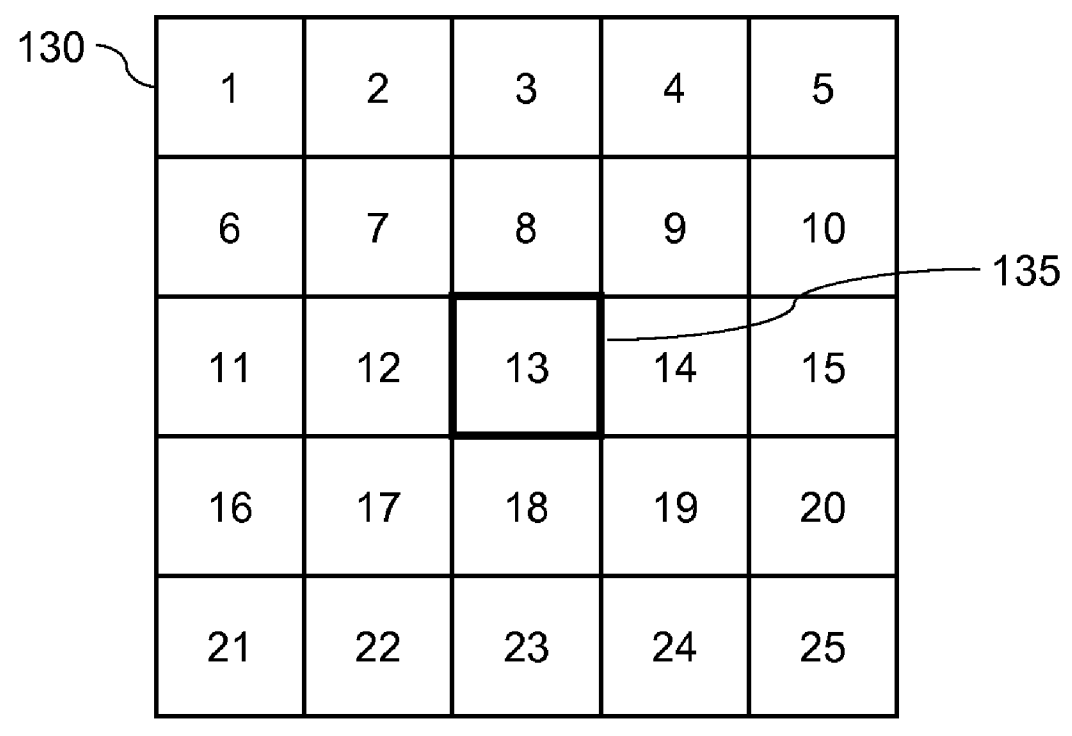

The index j is used to identify a neighboring pixel for the purpose of calculating a difference value. In a preferred embodiment of the present invention, difference values are calculated for a 5×5 window of pixels centered on a particular pixel. FIG. 10 shows an array of indices 130 centered on a current pixel location 135. The numbers shown in the array of indices 130 are the indices j. For example, an index value of j=6 corresponds top a pixel that is 1 row above and 2 columns to the left of the current pixel location 135.

The differential operator $\partial_j$ determines a difference between the pixel value for the current pixel, and the pixel value located at the relative position specified by the index j. For example, $\partial_6 S$ would correspond to a differential image determined by taking the difference between each pixel in the deblurred image L with a corresponding pixel that is 1 row above and 2 columns to the left. In equation form this would be given by:

$$\partial_j L = L(x,y) - L(x - \Delta x_j, y - \Delta y_j) \qquad (8)$$

where $\Delta x_j$ and $\Delta y_j$ are the column and row offsets corresponding to the $j^{th}$ index, respectively. It will generally be desirable for the set of differential images $\partial_j L$ to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

In a preferred embodiment of the present invention, the pixel-dependent weighting factor $w_j$ is determined using the following equation:

$$w_j = (w_d)_j (w_p)_j \qquad (9)$$

where $(w_d)_j$ is a distance weighting factor for the $j^{th}$ differential image, and $(w_p)_j$ is a pixel-dependent weighting factor for the $j^{th}$ differential image.

The distance weighting factor $(w_d)_j$ weights each differential image depending on the distance between the pixels being differenced:

$$(w_d)_j = G(d) \qquad (10)$$

where $d = \sqrt{\Delta x_j^2 + \Delta y_j^2}$ is the distance between the pixels being differenced, and $G(\cdot)$ is weighting function. In a preferred embodiment, the weighting function $G(\cdot)$ falls off as a Gaussian function so that differential images with larger distances are weighted less than differential images with smaller distances.

The pixel-dependent weighting factor $(w_p)_j$ weights the pixels in each differential image depending on their magnitude. For reasons discussed in the aforementioned article "Image and depth from a conventional camera with a coded aperture" by Levin et al, it is desirable for the pixel-dependent weighting factor w to be determined using the equation:

$$(w_p)_j = |\partial_j L|^{\alpha - 2} \qquad (11)$$

where $|\cdot|$ is the absolute value operator and $\alpha$ is a constant (e.g., 0.8). During the optimization process, the set of differential images $\partial_j L$ is calculated for each iteration using the estimate of L determined for the previous iteration.

The first term in the energy function given in Eq. (6) is an image fidelity term. In the nomenclature of Bayesian inference, it is often referred to as a "likelihood" term. It is seen that this term will be small when there is a small difference between the blurred image (B, i.e. captured image 230) and a blurred version of the candidate deblurred image (L) which as been convolved with the blur kernel 106 (K).

The second term in the energy function given in Eq. (6) is an image differential term. This term is often referred to as an "image prior." The second term will have low energy when the magnitude of the combined differential image 111 is small. This reflects the fact that a sharper image will generally have more pixels with low gradient values as the width of blurred edges is decreased.

The update candidate deblurred image step 112 computes the new candidate deblurred image 113 by reducing the energy function given in Eq. (8) using optimization methods that are well known to those skilled in the art. In a preferred embodiment of the present invention, the optimization problem is formulated as a PDE given by:

$$\frac{\partial E(L)}{\partial L} = 0. \qquad (12)$$

which is solved using conventional PDE solvers. In a preferred embodiment of the present invention, a PDE solver is used where the PDE is converted to a linear equation form that is solved using a conventional linear equation solver, such as a conjugate gradient algorithm. For more details on solving PDE solvers, refer to the aforementioned article by Levin et al. It should be noted that even though the combined differential image 111 is a function of the deblurred image L, it is held constant during the process of computing the new candidate deblurred image 113. Once the new candidate deblurred image 113 has been determined, it is used in the next iteration to determine an updated combined differential image 111.

Figure 11:
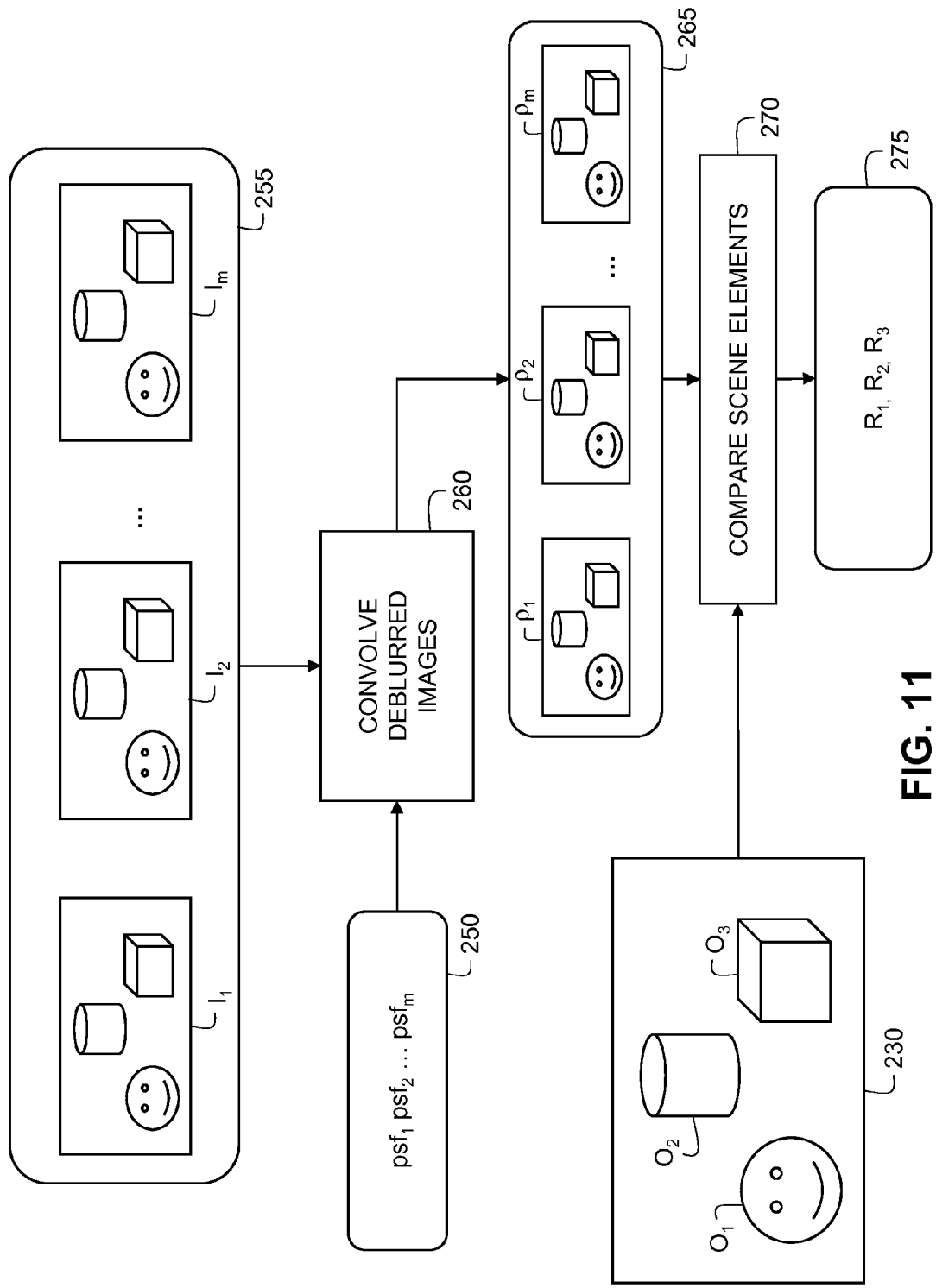
FIG. 11 is a process diagram illustrating a deblurred image set processed to determine the range information for objects in a scene, according to one embodiment of the present invention.

FIG. 11 shows a process diagram in which the deblurred image set 255, is processed to determine range information 275 for the objects in the scene, in accord with an embodiment of the present invention. In this embodiment, each element of the deblurred image set 255 is digitally convolved 260, using algorithms known in the art, with its corresponding element from the set of digitally represented psfs 250 in step 500. The result is a set of reconstructed images 265, whose elements are denoted $[\rho_1, \rho_2, \ldots \rho_m]$. In theory, each reconstructed image should be an exact match for the original captured image 230, since the convolution operation is the inverse of the deblurring, or deconvolution operation that was performed earlier. However, because the deconvolution operation is imperfect, no element of the resulting reconstructed image set 265 is a perfect match for the captured image 230. However, scene elements reconstruct with higher fidelity when processed with psfs corresponding to a distance that more closely matches the distance of the scene element relative to the plane of camera focus, whereas scene elements processed with psfs corresponding to distances that differ from the distance of the scene element relative to the plane of camera focus, exhibit poor fidelity and noticeable artifacts. With reference to FIG. 11, by comparing scene elements 270 from the reconstructed image set 265 with the corresponding scene elements in the captured image 230, range values 275 are assigned by finding the closest matches between the scene elements in the captured image 230 and the reconstructed versions of those elements from the reconstructed image set 265. For example, scene elements $O_1$, $O_2$, and $O_3$ in the captured image 230 are compared to their reconstructed versions in each element $[\rho_1, \rho_2, \ldots \rho_m]$ of the reconstructed image set 265, and assigned range values 275 of $R_1$, $R_2$, and $R_3$ corresponding to the psfs that yield the closest matches.

The deblurred image set 265 is intentionally limited by using a subset of blur parameters from the stored set. This is done for a variety of reasons, such as reducing the processing time to arrive at the range values 275, or to take advantage of other information from the capture device indicating that the full range of blur parameters is not necessary. The set of blur parameters used (and hence the deblurred image set 265 created) is limited in increment (i.e. sub-sampled) or extent (i.e. restricted in range).

Alternatively, instead of sub-setting or sub-sampling the blur parameters from the stored set, a reduced set of deblurred images is created by combining images corresponding to range values within selected range intervals. This might be done to improve the precision of depth estimates in a highly textured or highly complex scene which is difficult to segment. For example, let $z_m$, where m=1, 2, ... M denote the set of range values at which the blur parameters 245 have been measured. Let $\hat{i}_m(x,y)$ denote the deblurred images corresponding to range value m and blur parameters $p_m$. Further, let $\hat{I}_m(v_x,v_y)$ denote their Fourier transforms. If the range values are divided into M equal groups or intervals, each containing M range values, a reduced deblurred image set is defined as follows:

$$\hat{i}_{red} = \left\{ \frac{1}{N}\sum_{m=1}^{N} \hat{i}_m(x, y); \frac{1}{N}\sum_{m=N+1}^{2N} \hat{i}_m(x, y); \right.$$
$$\left. \frac{1}{N}\sum_{m=2N+1}^{3N} \hat{i}_m(x, y); \ldots \frac{1}{N}\sum_{m=(N/M)-N}^{N/M} \hat{i}_m(x, y); \right\} \quad (15)$$

In some arrangements, the range values are divided into unequal groups. In other arrangements, a reduced blurred image set is defined using a spatial frequency dependent weighting criterion via the following equation:

$$\hat{i}_{red} = \left\{ \frac{1}{N}\sum_{m=1}^{N} w(v_x, v_y)\hat{I}_m(v_xv_y); \frac{1}{N}\sum_{m=N+1}^{2N} w(v_x, v_y)\hat{I}_m(v_xv_y); \right.$$
$$\left. \ldots \frac{1}{N}\sum_{m=(N/M)-N}^{N/M} w(v_x, v_y)\hat{I}_m(v_x, v_y); \right\} \quad (16)$$

where $w(v_x,v_y)$ is a spatial frequency weighting function. Such a weighting function is useful, for example, in emphasizing spatial frequency intervals where the signal-to-noise ratio is most favorable, or where the spatial frequencies are most visible to the human observer. In some arrangements the spatial frequency weighting function is the same for each of the range intervals, however in other arrangements the spatial frequency weighting function is different for some or all of the intervals.

Figure 12:
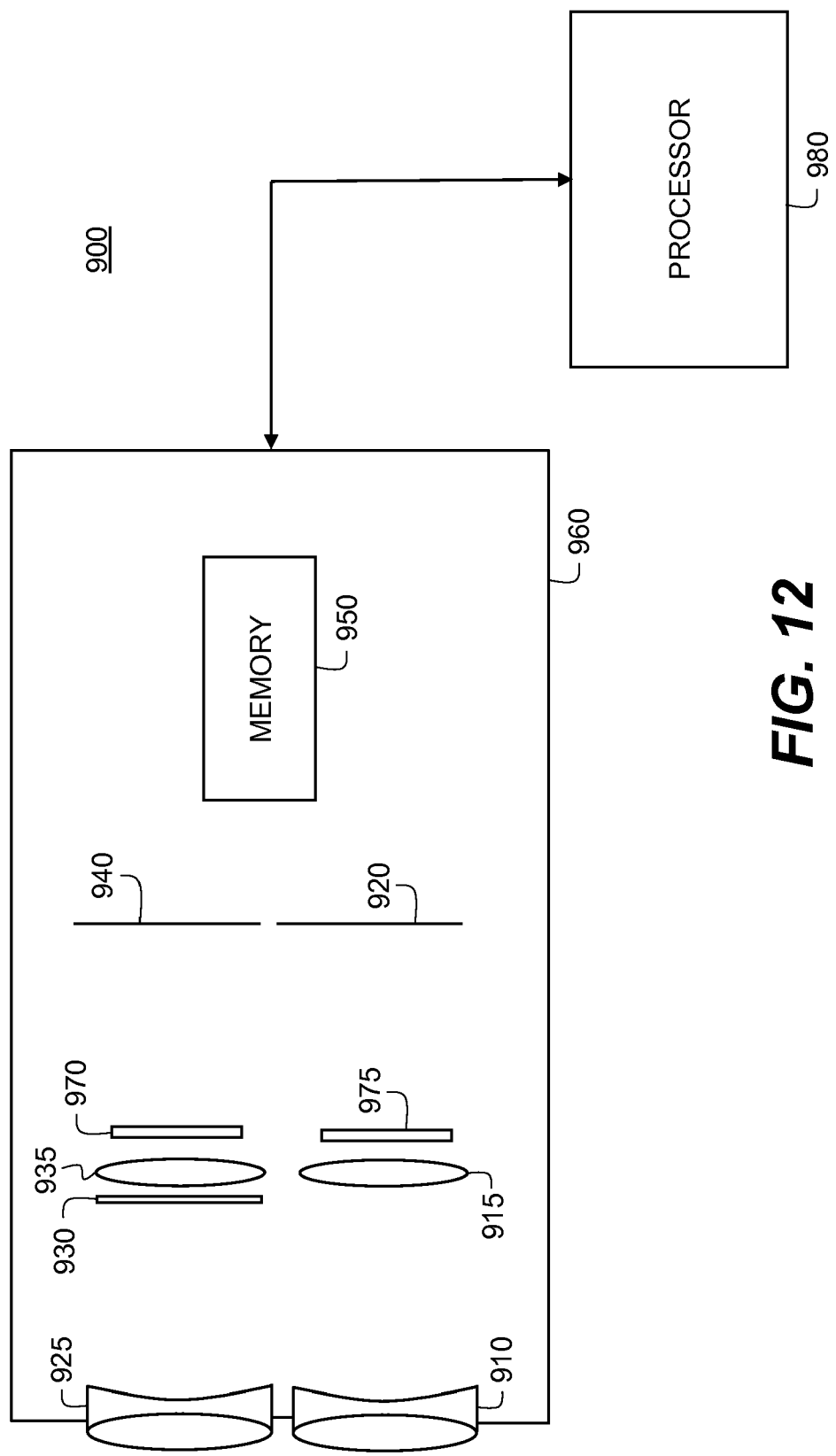
FIG. 12 is a schematic of a digital camera system according to one embodiment of the present invention.

FIG. 12 is a schematic of a digital camera system 900 in accordance with the present invention. The system includes two image sensors 920 and 940 and a coded aperture 930. The system further includes a first optical path, comprised of objective lens 925, coded aperture 930, relay lens 935 and image sensor 940, for capturing one or more images of a scene. The system further includes a second optical path, comprised of objective lens 910, relay lens 915 and image sensor 920, for capturing one or more images of a scene at equal or higher resolution than the first optical path. Also included are shutters 970 and 975, which are used to block either or both of the first or second optical paths during capture or calibration. Processor-accessible memory 950 is included for storing a set of blur parameters derived from range calibration data for each coded aperture 930, all inside an enclosure 960, and a data processing system 980 in communication with the other components, for providing a set of deblurred images using the captured images and each of the blur parameters from the stored set, and for using the set of deblurred images to determine the range information for the objects in the scene. The data processing system 980 is a programmable digital computer that executes the steps previously described for providing a set of deblurred images using captured images and each of the blur parameters from the stored set. Further, the data processing system 980 controls the image capture device, and controls the processing of the second captured image. In other arrangements, the data processing system 980 performs the processing of the second captured image. In some arrangements, the data processing system 980 is located inside the enclosure 980, in the form of a dedicated processor. It will be appreciated by those skilled in the art that while a two-lens, two-sensor arrangement similar to the capture device shown in FIG. 6 has been shown in this example, other arrangements of the digital camera system 900 can include single-sensor capture device arrangements such as those shown in FIGS. 4 and 5.

The invention has been described in detail with particular reference to certain preferred embodiments thereof, but it will be understood that variations and modifications can be effected within the spirit and scope of the invention.

PARTS LIST $s_1$ Distance
$s_2$ Distance
$s_1'$ Distance
$s_2'$ Image Distance
$P_1$ On-Axis Point
$P_2$ On-Axis Point
$P_1'$ Image Point
$P_2'$ Image Point
A Axial Image Point
$A_1$ Axial Image Point
$A_2$ Axial Image Point
D Clear Aperture Diameter
d Blur Circle Diameter
F Focal Plane
$R_0$ Object Distance
$D_1$ Planes
$D_2$ Planes
$O_1, O_2, O_3$ Scene Elements
$p_1, p_2, \ldots p_m$ Blur Parameters
$I_1, I_2, \ldots I_m$ Deblurred Set Elements
$J_1, J_2, \ldots J_m$ Deblurred image Set Elements
10 Lens
20 Axial ray
22 Axial ray
24 Axial ray
26 Axial ray
30 Lens
32 Binary transmittance mask
34 Lens
40 Image capture device
41 Objective lens
42 Beamsplitter
43 Mirror
44 Coded aperture
45 Relay lens
46 Mirror
47 Relay lens
48 Beam combiner
49 Image sensor
50 Memory
51 Blur parameters 53 Light ray
54 Reflected light ray
55 Transmitted light ray
56 Reflected light ray
57 Shutter
58 Shutter
60 Image capture device
61 Objective lens
62 Relay lens
63 Beam combiner
64 Electronic sensor array
65 Objective lens
66 Coded aperture
67 Relay lens
68 Mirror
70 Axial ray
71 Axial ray
72 Transmitted Light ray
73 Memory
74 Blur parameters
75 Shutter
76 Shutter
80 Image capture device
81 Objective lens
82 Relay lens
83 Electronic sensor array
84 Objective lens
85 Coded aperture
86 Relay lens
87 Electronic sensor array
88 Axial ray
89 Axial ray
90 Memory
91 Blur parameters
93 Shutter
94 Shutter
102 Receive blurred image step
104 Initialize candidate deblurred image step
105 Receive blur kernel step
106 Blur kernel
107 Candidate deblurred image
108 Compute differential images step
109 Differential images
110 Compute combined differential image step
111 Combined differential image
112 Update candidate deblurred image step
113 New candidate deblurred image
114 Convergence test
115 Convergence criterion
116 Deblurred image
117 Store deblurred image step
130 Image array indices
135 Current pixel location
200 Provide image capture device step
205 Light source
210 Condenser optics
215 Light ray
220 Light ray
230 Captured image
240 Memory
245 Blur parameters
250 Point spread functions (digital representation)
255 Deblurred image set
260 Convolve deblurred images step
265 Reconstructed image set
270 Compare scene elements step
275 Range information
300 Store blur parameters step
400 Capture image step
500 Provide set of deblurred images step
600 Determine range information step
700 Control capture device step
800 Control image processing step
900 Digital camera system
910 Objective lens
915 Relay lens
920 Image sensor
925 Objective lens
930 Coded aperture
935 Relay lens
940 Image sensor
950 Memory
960 Enclosure
970 Shutter
975 Shutter
980 Processor

The invention claimed is:

1. A method of using an image capture device to identify range information for objects in a scene, comprising:
   a) providing an image capture device having at least one image sensor, a coded aperture, a first optical path including the coded aperture and a second optical path not including the coded aperture;
   b) storing in a memory a set of blur parameters derived from range calibration data for the coded aperture;
   c) capturing a first and second image of the scene having a plurality of objects, corresponding to the first and second optical paths, respectively, the second image having equal or higher resolution than the first;
   d) providing a set of deblurred images using the first capture image and each of the blur parameters from the stored set;
   e) using the set of deblurred images to determine the range information for the objects in the scene captured by the first optical path; and
   f) using the range information to control the image capture device or processing of the higher resolution second image.

2. The method of claim 1 wherein step d) includes for each deblurred image:
   i) initializing a candidate deblurred image;
   ii) determining a plurality of differential images representing differences between neighboring pixels in the candidate deblurred image;
   iii) determining a combined differential image by combining the differential images;
   iv) updating the candidate deblurred image responsive to the captured image, the blur kernel, the candidate deblurred image and the combined differential image; and
   v) repeating steps i)-iv) until a convergence criterion is satisfied.

3. The method of claim 1, wherein step c) includes capturing first and second image sequences, corresponding to the first and second optical paths, respectively, the second image sequence having equal or higher resolution than the first.

4. The method of claim 3, wherein step e) includes determining range information for each image in the sequence.

5. The method of claim 4, wherein step f) includes using the range information to control the image capture device or processing of some or all of the images in the second image sequence.

6. The method of claim 4, wherein range information is determined for a subset of images in the sequence.

7. The method of claim 6, wherein step f) includes using the range information determined for a subset of images in the first lower resolution image sequence to control the image capture device or processing of some or all of the images in the second higher resolution image sequence.

8. The method of claim 3, wherein the step of initializing a candidate deblurred image includes:
   a) determining a difference image between the current and previous image in the image sequence; and
   b) initializing a candidate deblurred image responsive to the difference image.

9. The method of claim 1, wherein step d) includes using a subset of blur parameters from the stored set.

10. The method of claim 1, wherein step b) includes using a set of blur parameters derived from calibration data at a set of range values, such that there is a blur kernel for the coded aperture at each corresponding range value.

11. The method of claim 1, wherein step b) includes using a set of blur parameters derived from calibration data at a set of range values, such that there is not a blur kernel for the coded aperture at each corresponding range value.

12. The method of claim 1, wherein step e) includes combining deblurred images resulting from blur parameters corresponding to range values within selected intervals.

13. The method of claim 12, further including combining the deblurred images according to a spatial-frequency dependent weighting criterion.

14. The method of claim 1, wherein step a) includes an image capture device having at least two image sensors, a first image sensor optically coupled with the first optical path, and a second sensor of equal or higher resolution optically coupled with the second optical path.

15. The method of claim 14, wherein the first image sensor is used to determine range information for the objects in the scene, and the range information is used to control the capture or processing of the images from the equal or higher resolution second image sensor.

16. The method of claim 1, wherein step a) includes an image capture device having a single image sensor, which is alternately coupled with the first optical path and the second optical path.

17. The method of claim 16, wherein the first optical path is used to determine range information for the objects in the scene, and the range information is used to control the capture or processing of the images captured using the second optical path.

18. A digital camera system comprising:
   a) at least one image sensor;
   b) a coded aperture;
   c) a first optical path, including the coded aperture, for capturing one or more images of a scene;
   d) a second optical path, not including the coded aperture, for capturing one or more images of a scene at equal or higher resolution than the first optical path;
   e) a processor-accessible memory for storing a set of blur parameters derived from range calibration data; and
   f) a data processing system for
      i) providing a set of deblurred images using captured images and each of the blur parameters from the stored set;
      ii) using the set of deblurred images to determine the range information for the objects in the image of the scene captured by the first optical path; and
      iii) using the range information to control the image capture device, or the processing of the second captured image.

* * * * *